(12) United States Patent
Sacerio

(10) Patent No.: US 7,716,990 B1
(45) Date of Patent: May 18, 2010

(54) PORTABLE ELECTROLUMINESCENT DIAGNOSTIC GAUGE

(75) Inventor: Jose Sacerio, Hialeah, FL (US)

(73) Assignee: CPS Products, Inc., Hialeah, FL (US)

( * ) Notice: Subject to any disclaimer, the term of this patent is extended or adjusted under 35 U.S.C. 154(b) by 82 days.

(21) Appl. No.: 12/061,163

(22) Filed: Apr. 2, 2008

(51) Int. Cl.
*G01L 7/00* (2006.01)
(52) U.S. Cl. .............................. 73/700; 73/732; 73/733
(58) Field of Classification Search ........................ None
See application file for complete search history.

(56) References Cited

U.S. PATENT DOCUMENTS

| | | | |
|---|---|---|---|
| 2,272,806 A | | 2/1942 | Klein et al. |
| 2,439,770 A | * | 4/1948 | Brown et al. ................... 73/750 |
| 2,986,938 A | * | 6/1961 | Grandstaff .................... 73/706 |
| 3,094,970 A | | 6/1963 | Zargarpur |
| 3,219,008 A | | 11/1965 | Harris et al. |
| 3,503,365 A | | 3/1970 | Baez et al. |
| 3,888,127 A | * | 6/1975 | Shamlian et al. ............... 73/431 |
| 4,561,042 A | * | 12/1985 | Wehner et al. ................. 362/30 |
| 5,839,810 A | | 11/1998 | Hersel et al. |
| 6,394,977 B1 | | 5/2002 | Taylor et al. |
| 6,415,672 B1 | | 7/2002 | Hamilton et al. |
| 2004/0173025 A1 | * | 9/2004 | Hildebrand et al. ........... 73/700 |

\* cited by examiner

*Primary Examiner*—Lisa M Caputo
*Assistant Examiner*—Jermaine Jenkins
(74) *Attorney, Agent, or Firm*—Malin Haley DiMaggio Bowen & Lhota, P.A.

(57) ABSTRACT

A self contained internally illuminated diagnostic gauge used to display the magnitude of physically measured quantities in low or no light areas. The diagnostic gauge uses mechanical gauge needles to indicate the magnitude of the measurements on a dial. The dial is illuminated internally with a thin and flexible electroluminescent panel layer. This electroluminescent layer emits photons of light in response to a applied electrical energy. The electrical energy is supplied from a small battery system and driven through electronic circuitry both of which are contained inside of the gauge shell housing unit. The gauge shell has a removable battery cover that enables access to the power supply and the electronic drive circuitry of the device.

11 Claims, 3 Drawing Sheets

PORTABLE ELECTROLUMINESCENT DIAGNOSTIC GAUGE

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

1. Field of the Invention

The present invention relates generally to mechanical diagnostic gauge devices for measuring physical quantities in industrial applications, and more particularly, to a portable diagnostic gauge device that displays the magnitude of physical quantities in industrial applications and has an electroluminescent panel that illuminates the dial in dark or low light areas for improved visibility of gauge readings.

2. Description of Related Art

Industrial mechanical/analog diagnostic gauges are required and used for reading and displaying a variety of important measurements that must be periodically monitored to facilitate quality control and safety. However, in many industrial applications these gauges are located in areas where there is little to no light and, or inadequate space, making it difficult, if not impossible, to reliably read measurements. It is especially difficult to accurately read these gauges in dim lighting when it is situated several feet from the operator or in a cramped space. These obstacles increase the risk of inaccurate or neglected readings.

A variety of devices and methods are known that proffer to address and resolve these problems, but they have realized little to no practical success or acceptance. These attempts include the use of auxiliary lighting, luminescent materials and reflective materials that require an external source of light and complicated electronics, such as piezoresistive transducers, as disclosed in U.S. Pat. Nos. 6,415,672, 6,394,977, 5,839,810, 4,561,042, 3,503,365, 3,219,008, 3,094,970 and 2,272,806. For instance, U.S. Pat. Nos. 2,272,806 and 3,503,365 disclose the use of external or auxiliary light sources for illuminating gauges. As noted, external light sources dramatically increase cost and complexity in design, requiring additional wiring, equipment and time. Furthermore, external light sources reduce the portability of the diagnostic gauge device. Providing a gauge with contrasting colors in the construction of the dial has also been suggested. The contrasting colors, however, require light to see and thus do not allow for the recording of accurate measurements in no light conditions.

Other attempts to improve gauge visibility proffer the use of luminescent and reflective materials to construct the face, the face markings and the hands, such as disclosed in U.S. Pat. Nos. 4,561,042 and 6,415,672. These luminescent materials absorb energy from both ambient and direct light. The ambient or direct light causes the luminescent material to charge, after which the material can glow. Luminescent display gauges are not suitable for applications that are constantly in dark. Situations that do not allow for exposure to any direct light require an external ambient light source in close proximity to the gauge in order to charge the luminescent material. The need for an external ambient light source dramatically increases costs. Furthermore, the need for an external light source reduces the portability of the diagnostic gauge and the ease of replacing such devices.

Diagnostic gauges are not only limited to industrial applications. In recent years, a need for small and reusable diagnostic gauges for medical devices has grown. Specifically, there is a need for pressure gauges to be used in syringes that are used to inflate angioplasty balloons. One major requirement is the need for a device that can withstand the harsh temperatures and chemicals present in the sterilization process to enable a reusable pressure gauge. Due to the requirement of repeated use, a piezoresistive transducer is used instead of a bourdon tube to measure the fluid pressure, as disclosed in U.S. Pat. No. 6,394,977. Furthermore, an analog mechanical display device, utilizing a stepper motor is used and can withstand the elevated temperatures of the sterilization procedure. The stepper motor is sent digital signals representing the actual measurements from a microprocessor. This microprocessor is powered with a battery contained within the gauge housing. As a result of the applications in medical devices used during surgery it once again becomes difficult to reliably read the measurements of the syringe pressure gauge.

Another attempt involves the use of an infrared emitter and receiver to present data on a separate, easily viewable, display. This solution adds many components, which dramatically increase the cost of the pressure gauge. Another attempt uses an internal illumination system such as the electroluminescent display system of watches. Many watch illumination systems utilize an electroluminescent material as a source of ultraviolet (UV) light. Indicators on the watch face are covered with a phosphorescent material. Upon exposure to UV light emitted from the electroluminescent material, the phosphorescent indicators emit visible light through a process known as fluorescence. As the efficiency of electroluminescent materials has improved, many watches now utilize electroluminescent materials to emit visible light, thus illuminating the watch face.

Electroluminescent layers have also been used to illuminated industrial diagnostic gauges, as disclosed in U.S. Pat. Nos. 6,394,977, 5,839,810, 3,219,008 and 3,094,970. Usually, an electroluminescent layer can be either bonded or printed onto a support plate. A clear dial face is applied over the electroluminescent layer to create a readable illuminated dial. Electrical contacts are made through an electrically conductive layer, which connects the electroluminescent layer to electrical drive and control components located on the backside of the support plate. The electrical contacts are either made using a through-hole design or a wrap around design. The attachment of the electrical components to the back of the support plate makes it difficult to access the circuitry to perform a variety of functions, such as activating an on-off switch, changing batteries, controlling the illumination of the dial, performing maintenance or making other adjustments. These devices also are powered by bulky external power sources that further decrease the portability of the device.

Regardless of the application, industrial, medical or otherwise, the ability to accurately read measurements displayed in analog is necessary and predicated on the ability to see the face of the gauge regardless of the level of ambient light. Unfortunately, the aforementioned attempts fail to disclose or suggest a mechanical/analog diagnostic gauge adapted for reliable visibility in dim to dark conditions without compromising size, costs, adaptability or portability. The instant invention fills this void in the related art with a diagnostic gauge that employs a highly efficient electroluminescent display that is compact, portable and interchangeable as contemplated by the instant invention disclosed herein.

SUMMARY OF INVENTION

The present invention comprises an internally illuminated mechanical/analog diagnostic gauge having at least one measurement scale display, panel or dial and internal battery powered electroluminescent panel that internally illuminates the measurement display to facilitate visibility in dim light and dark environments beyond several feet in a compact architecture adapted for portability and conventional applications. The instant invention is also designed to accommodate and may comprise a plurality of interchangeable measurement panels and, or transparent overlays imprinted with different scales or units. The illuminable gauge of the instant invention incorporates an internal electroluminescent panel that makes the gauge readings viewable from a distance with little to no ambient or external light without comprising size or requiring additional space for external or auxiliary light sources. The electroluminescent gauge is also designed for conveniently accessing and changing measurement panels or performing maintenance in a timely manner. Various electroluminescent materials can be used in order to emit different wavelengths to easily identify the type of measurement being made.

The electroluminescent gauge of the instant invention preferably comprises a gauge support housing, gauge needle, electroluminescent panel and electronic circuitry for controlling operation of the gauge, generating light photons and operating the electroluminescent panel with minimal battery drain. The electroluminescent panel illuminates the diagnostic gauge measurement scale, which may be imprinted directly on the electroluminescent panel or on a transparent panel overlay according to one or more selected unit scales. The instant invention may comprise a plurality of scaled overlays with units according to different scales that may be conveniently interchanged according to a desired scale setting that accommodates the desired application. The housing or shell of the instant invention is designed to fit into conventional and small spaces. The housing includes a removable lid that allows for easy access to the battery compartment and, or electronic components when maintenance is required.

In light of the foregoing, it is an object of the present invention to provide a portable electroluminescent diagnostic gauge that is self-illuminating.

It is also an object of the instant invention to provide a portable electroluminescent diagnostic gauge that is readable in little to no light without auxiliary or external light sources.

It is another object of the instant invention to provide a portable electroluminescent diagnostic gauge that reduces the risk of inaccurate and neglected measurements. It is an additional object of the instant invention to provide a portable electroluminescent diagnostic gauge that is adapted for use in small spaces.

It is also an additional object of the instant invention to provide a portable electroluminescent diagnostic gauge that is adapted for use without external power or spare batteries.

It is a further object of the instant invention to provide a portable electroluminescent diagnostic gauge that is adapted for use with a plurality of different electroluminescent materials.

It is yet an additional object of the instant invention to provide a portable electroluminescent diagnostic gauge that is cost effective.

It is yet another object of the instant invention to provide a portable electroluminescent diagnostic gauge that is adapted for mass production.

In accordance with these and other objects, which will become apparent hereinafter, the instant invention will now be described with particular reference to the accompanying drawings.

BRIEF DESCRIPTION OF DRAWINGS

FIG. 1 shows a mechanical diagnostic gauge assembly comprised of an electroluminescent panel with dial markers printed directly on.

DETAILED DESCRIPTION OF THE PREFERRED EMBODIMENTS

Figure 1:
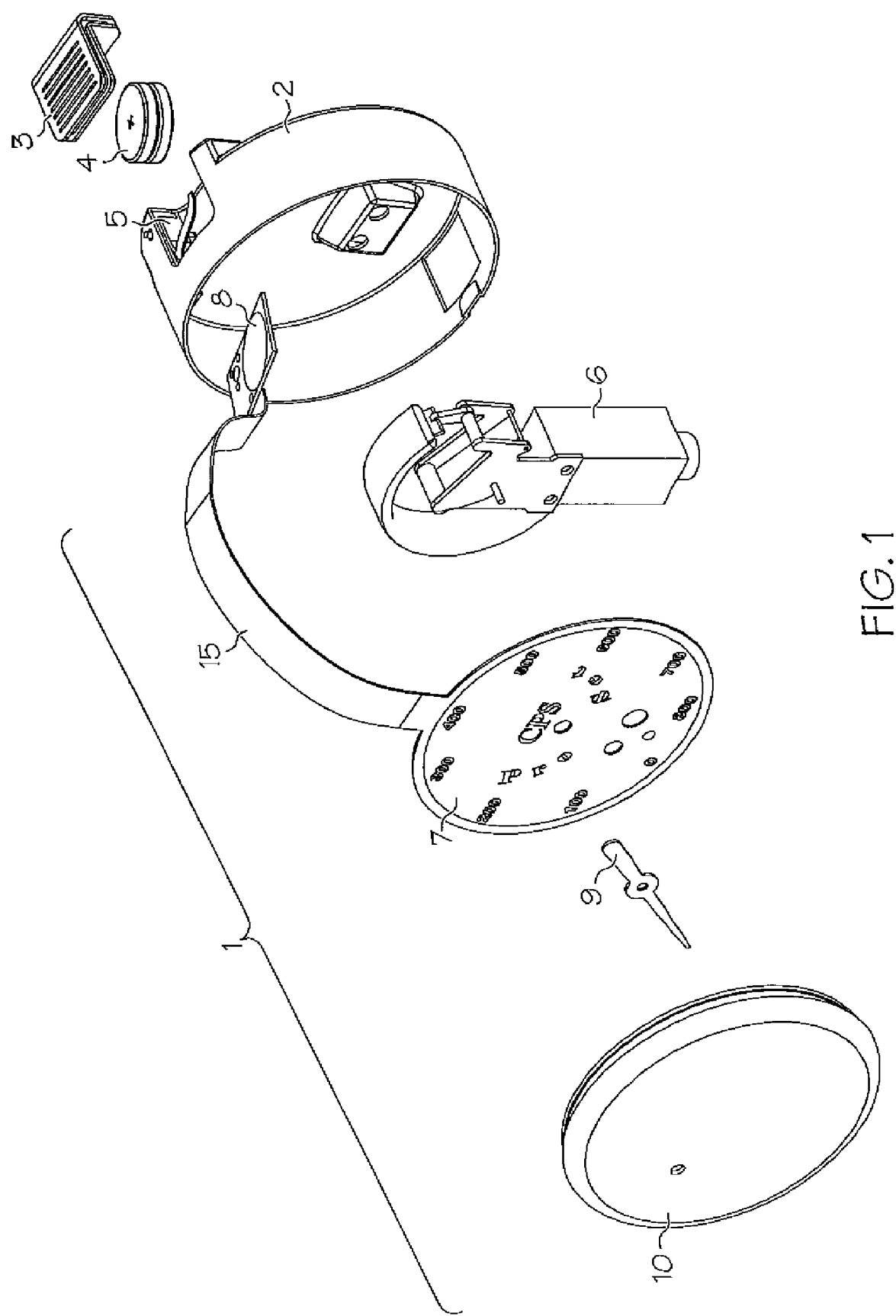
Figure 2:
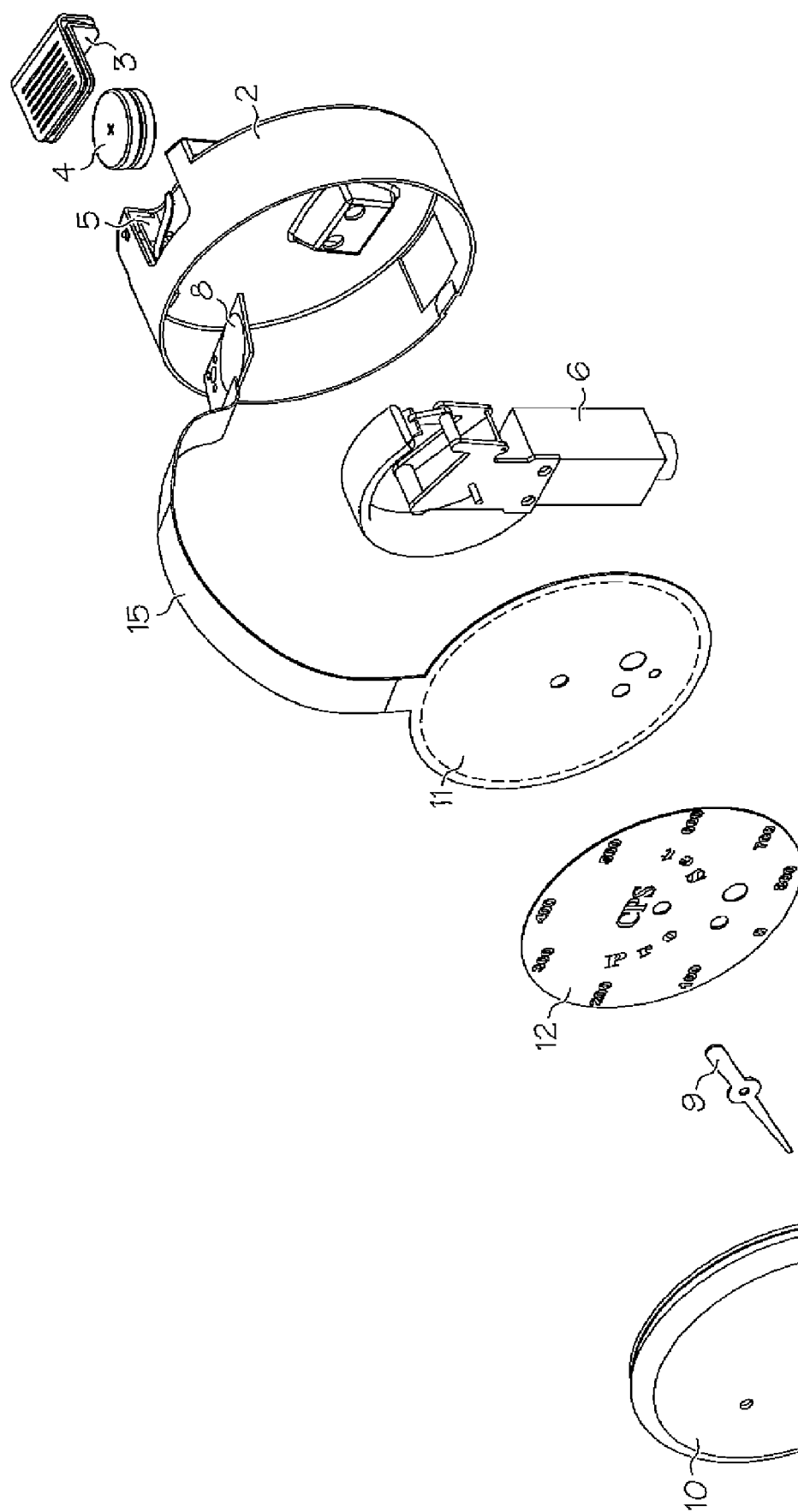
FIG. 2 shows a mechanical diagnostic gauge assembly comprised of a blank electroluminescent panel and a transparent scale.
Figure 3:
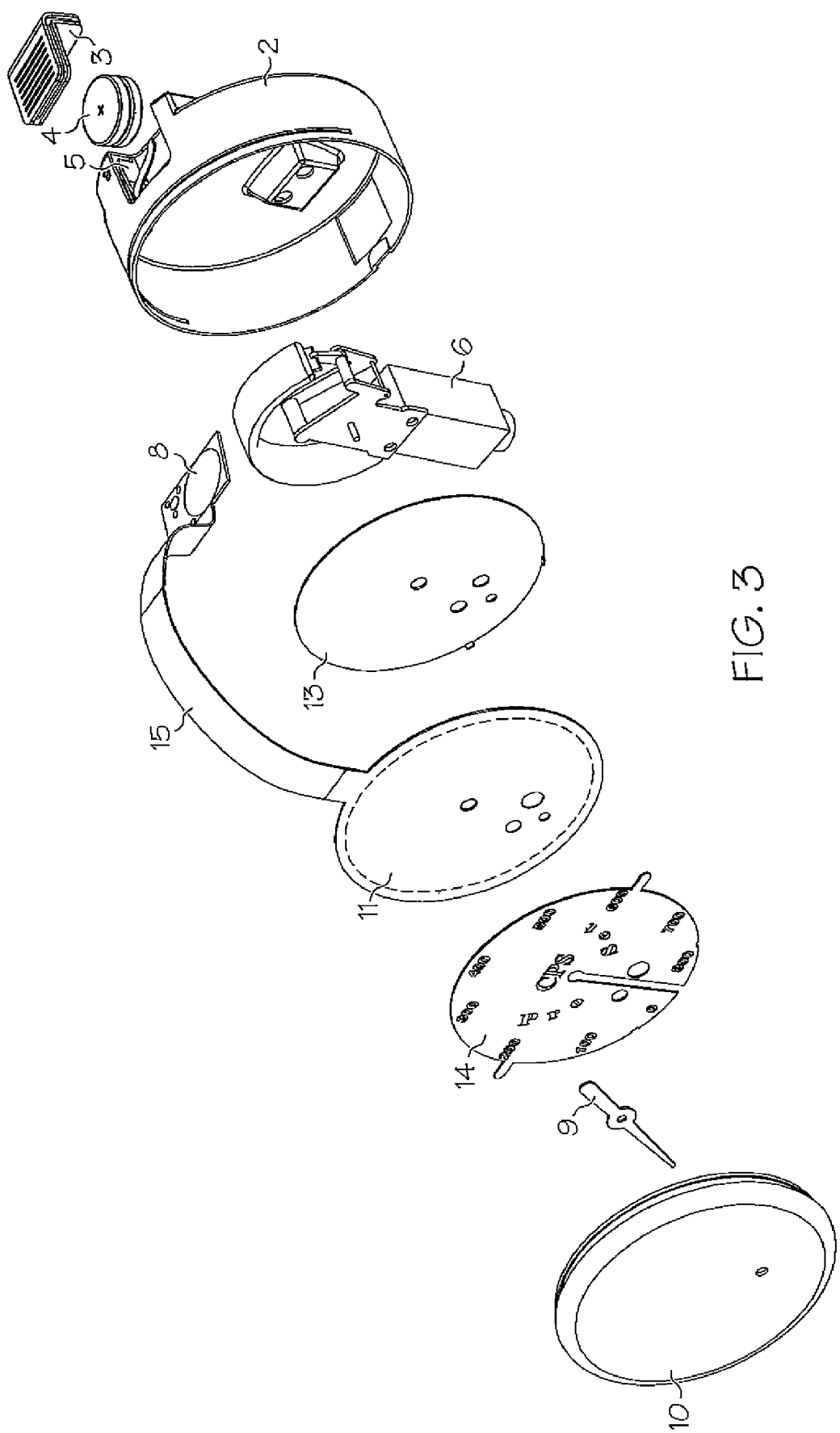
FIG. 3 shows a mechanical diagnostic gauge assembly comprised of a gauge dial locating plate, a blank electroluminescent panel and a transparent removable scale.

With reference to the drawings, FIGS. 1 to 3 depict the preferred embodiment of the instant invention which is generally referenced as an electroluminescent diagnostic gauge, electroluminescent mechanical gauge, electroluminescent gauge, gauge and, or by numeric character 1. The electroluminescent diagnostic gauge 1 of the instant is adapted for use with any mechanical gauge where a dial or needle is used. The present invention 1 is designed for refrigeration systems but is also adaptable for use in other systems that measure the magnitude of physical quantities, such as gas pressure, liquid pressure and temperature. Although the instant invention 1 is described herein with reference to Bourdon tubes for measuring pressure, the electroluminescent diagnostic gauge 10 may be used with any mechanical gauge where a dial is used.

With reference to FIGS. 1-3, the preferred and alternative embodiments of the gauge of the instant invention 1 comprise a very thin substrate or panel 7 having an electroluminescence material and a scale, dial or needle 9 and support shell 2 that securely conceals the components of the instant invention 1. The scale may be imprinted directly on the panel 7 or on a transparent overlay, which is placed in alignment with the dial/needle 9 and panel 7 for illuminated reading. The electroluminescence material of the panel 7 uses little power, may be imprinted on a variety of surfaces, including the panel 7, and may comprise a variety of colors. The electroluminescence material employed comprises a solid-state property in which semiconductor crystals, known as phosphors, emit light in response to applied electrical energy. As electroluminescence is a highly efficient source for electrically producing light, the electroluminescent panel 7 use very low power and has minimal energy loss due to heat dissipation or Infrared (IR) emissions. The thin electroluminescence phosphor layer emits light in response to applied electrical energy from an AC power source. The electroluminescent panel 7 is constructed as a "Lossy Capacitor" with an electroluminescent phosphor layer embedded within a dielectric material between two electrodes. The bottom electrode is opaque and the top electrode is transparent allowing the light photons emitted by the phosphors to pass through the top electrode layer. The electroluminescent panel 7 may be powered with an interchangeable DC battery and DC/AC inverter drive circuitry. Both the electronic drive circuitry and battery power source are situated to be conveniently accessible within the gauge shell 2. The instant invention 1 is conveniently mountable and changeable and facilitates reading gauge measurements in low light and dark environments and, or where it is difficult to get close to the gauge 1.

With reference to FIG. 1, the present invention 1 may comprise a bourdon tube assembly 6 to measure and display fluid and, or gas pressure(s) within a system. The bourdon tube assembly 6 utilizes a coiled tube that expands and contracts due to pressure changes in the desired gas or liquid being measured. An increase in pressure causes the tube to uncoil, while a decrease in pressure causes the tube to contract toward a coil. The movements of the coiled tube, resulting from changes in the pressure, are transferred to a gear train. This gear train, in turn, causes a needle 9 to deflect a specific amount based upon the amount of contraction or expansion induced in the tube coil. A dial face with specific measurement markings is mounted behind the needle 9 on the panel 7. These markings are calibrated with the tube coil to display the magnitude of the physical measurement with respect to the deflection level of the needle 9.

With reference to FIG. 1, the bourdon tube embodiment of the diagnostic gauge 1 comprises a gauge shell 2, removable gauge battery cover 3, battery or structure for using an auxiliary battery 4, driver and control electronic assembly housing 5, bourdon tube assembly 6, printed electroluminescent panel 7, driver and control electronics 8, at least one gauge dial/needle 9 and plastic lens 10. The gauge shell 2 is preferably constructed from a durable material adapted to the specific environmental conditions and applications in which the diagnostic gauge 1 is to be used. In accordance with the preferred and alternative embodiments of the instant invention 1, the printed electroluminescent panel 7 is preferably durable and flexible and illuminates diagnostic gauge measurements indicated by the scale and dial/needle 9 for visible reading in dim to dark conditions. The preferred embodiment of the electroluminescent panel 7 is imprinted with a selected measurement scale, as shown in FIG. 1, and comprises a thin "Lossy Capacitor" electroluminescent lamp of phosphors dispersed in a dielectric material between an opaque electrode and transparent electrode. One such electroluminescent lamp that may be used is the QUANTAFLEX 1600™ lamp manufactured by MKS Instruments. The QUANTAFLEX 1600™ uses phosphor particles comprised of doped Zinc Sulfide. The type and amount of dopant used determines the wavelength of light emitted by the electroluminescent lamp, which enables the production of diagnostic gauges 1 that may be illuminated with one or more different colored lights. The color light emitted by the panel 7 may be select to visually indicate the type of measurement being made. The electroluminescent panel 7 is extremely flexible and durable, allowing the diagnostic gauge to be manufactured in a simple and cost effective method.

With reference to FIG. 1, the instant invention 1 comprises a measurement scale of markings printed directly on the electroluminescent panel 7, which is mounted onto the bourdon tube diagnostic member assembly 6. At least one gauge needle 9 is coupled to a gear train located within the bourdon tube assembly 6 on top of the printed electroluminescent panel 7. In accordance with the foregoing, variations in pressure cause the coiled tube in the bourdon tube assembly 6 to expand or tighten. This movement of the coiled tube causes shifts in the gear train located inside of the bourdon tube assembly 6 causing angular displacement of the gauge needle/dial 9 in a clockwise and, or counter clockwise direction. This angular displacement dictates the position of at least one gauge needle 9 with respect to the scale markings on the printed electroluminescent panel 7 indicating the desired measurement, such as the magnitude of the pressure.

The printed electroluminescent panel 7 is electrically connected to the driver and control electronics 8 by a bridge 15, which extends over the bourdon tube assembly 6. The bridge 15 is preferably made from a polyamide-based flexible printed circuit board terminated with a pair of crimped pins. These crimped pins are inserted into a socket that is located in the drive electronics assembly 8. The drive and control circuits 8 are located at the end of the bridge 15 and secured in the electronics assembly housing 5. The driver electronics 8 comprises a DC/AC inverter to convert the DC power supplied by the battery 4 to AC power. The type and size of the battery used is dependent on the amount of power required for proper operation of the electroluminescent gauge 1. The total power consumption depends on the size and color transmissions of the electroluminescent panel 7, the voltage and frequency at which the lamp is driven, and the efficiency of the inverter. The amount of power required and, or consumed generally falls in the range between 0.01-0.06 Watt/in$^2$ for the total electroluminescent panel 7 area. Depending on the efficiency of the electroluminescent panel 7 in converting electrical energy to light photons and the efficiency of the inverter circuit, a minimal number of small batteries may be used to power the device 1, eliminating the need for bulky external power sources that reduce portability and efficiency of the diagnostic gauge.

In accordance with the instant invention, the control electronics 8, when powered, cause the electroluminescent panel 7 to emit light. The control electronics 8 are electrically coupled with the driver electronics 8 to the battery 4 and the printed electroluminescent panel 7. The control electronics 8 enable the device to automatically disconnect the power source after a specific amount of time thus conserving the operational life span of the battery 4. The panel 7 provides a clear and evenly illuminated gauge scale display that is viewable from far distances in both low and no light conditions and free of shadows and glare. The panel 7 may be operated for long lengths of time with minimal maintenance.

The gauge shell 2 houses at least one gauge needle 9, the printed electroluminescent panel 7, the bourdon tube assembly 6, the control and driver electronics 8, the bridge 15, the electronics assembly housing 5 and the battery 4. Both the battery 4 and the control and driver electronics 8 are contained within the electronics assembly housing 6. The instant invention 1 includes an access opening in the gauge shell 2 that is accessed through and covered with a removable battery cover 3. The removable battery cover 3 allows for easy access to the drive and control circuitry 8 and the battery supply 4 for routine maintenance and changing batteries. The gauge shell 2 also includes a plastic lens 10 for protecting and viewing measurement readings. The plastic lens 10 comprises a high impact lexan lens that is fitted into the gauge shell 2. The containment of all components inside the gauge shell 2 creates a portable device that can be easily changed and maintained.

With reference to FIG. 2, another embodiment of the instant invention 1 provides a diagnostic gauge 1 comprising a gauge shell 2, removable gauge battery cover 3, battery 4, driver and control electronic assembly housing 5, bourdon tube assembly 6, blank electroluminescent panel 11 having no scale markings, transparent scale film/overlay 12 having measurement markings according to a predetermined scale and units, driver and control electronics 8, at least one gauge needle 9 and plastic lens 10. In this embodiment of the instant invention 1, the scale markings are printed on the transparent scale film/overlay 12, which allows overlays 12 having different scales and units to be interchanged in accordance with the desired measurements to be taken and without having to change the electroluminescent panel 7. This embodiment also allows the creation and, or use of a plurality of customized transparent scale films 12 that facilitate cost-effective measurements according to a plurality of requisite measurement scales. The transparent scale film 12 of this embodiment of the instant invention 1 is preferably mounted to a blank electroluminescent panel 11 by adhesives or comparable substitutes. In accordance with this embodiment, the blank electroluminescent panel 11 with the adhesively bonded transparent scale film 12 is mounted directly onto the bourdon tube assembly 6. At least one gauge needle 9 is located on top of the transparent scale film 12 and coupled to the gear train of the bourdon tube assembly 6 through the transparent scale film 12 and the blank electroluminescent panel 11. Accordingly, movement of the bourdon tube assembly 6 gears causes angular deflection of at least one gauge needle 9 a distance corresponding to the measurement.

With reference to FIG. 3, another embodiment of the diagnostic gauge 1 comprises a gauge shell 2, removable gauge battery cover 3, battery powering device 4, electronic driver and control circuitry assembly housing 5, bourdon tube assembly 6, back support plate 13, blank electroluminescent panel 11, interchangeable transparent scales 14, driver and control electronics 8, at least one gauge needle 9 and plastic lens 10. In this embodiment of the instant invention 1, a back support plate 13 is attached to the blank electroluminescent panel 11 to increase the rigidity and durability of the electroluminescent panel 11. The back support plate 13 and blank electroluminescent plate 11 are mounted directly onto the bourdon tube assembly 6. An interchangeable transparent scale 14 is inserted over the blank electroluminescent plate 11 in a desired position. At least one gauge needle 9 is located on top of the transparent removable scale 14. The gauge needle 9 is coupled to the gear train of the bourdon tube assembly 6 through the transparent removable scale 14, blank electroluminescent layer 11 and gauge dial locating plate 13. The back support plate 13 allows a number of different removable scales 14 to be interchanged based on the specific application of the electroluminescent gauge 1.

The instant invention has been shown and described herein in what is considered to be the most practical and preferred embodiment. It is recognized, however, that departures may be made therefrom within the scope of the invention and that obvious structural and/or functional modifications will occur to a person skilled in the art.

What is claimed is:

1. A portable electroluminescent mechanical gauge device for measuring and displaying the magnitude of physical quantities, such as pressure or temperature, said device comprising:

means for sensing a physical quantity level in a predetermined environment;

a needle in communication with said sensing means so as to move a distance in proportion to the physical quantity level sensed by said sensing means;

scale means, oriented in relation to said needle, for indicating the distance said needle moves, said distance corresponding to the physical quantity level sensed by said sensing means;

an electroluminescent panel positioned to illuminate said scale means when said panel is electrically energized;

said electroluminescent panel being an independent surface-area light emitting source upon the application of electric energy;

said electroluminescent panel not constituting a fluorescent panel;

electrical control circuit means for controlling power to said panel; and electronics bridge electrically communicating said electrical circuit means and said panel.

2. A device as recited in claim 1, further comprising:

power means, in electrical communication with said electrical control circuit means, for receiving and directing electrical power to said electrical control circuit means.

3. A device as recited in claim 1, wherein said sensing means comprises:

a bourdon tube assembly in mechanical communication with said needle so as to facilitate movement of said needle in proportion to the level of the physical quantity sensed by said bourdon tube assembly.

4. A device as recited in claim 1, wherein said electrical control circuit means comprises:

means for automatically removing electrical power to said device.

5. A device as recited in claim 1, wherein said sensing means is adapted for measuring gas pressure.

6. A device as recited in claim 1, wherein said sensing means is adapted for measuring liquid pressure.

7. A device as recited in claim 1, wherein said sensing means is adapted for measuring temperature.

8. A device as recited in claim 1, wherein said scale means is supported by said panel.

9. A device as recited in claim 1, further comprising:

a transparent overlay supporting said scale means.

10. A device as recited in claim 9, further comprising:

a plurality of interchangeable transparent overlays each supporting a different measurement scale of said scale means for facilitating the display of different physical quantities as measured by said sensing means.

11. A device as recited in claim 1, further comprising:

a back support plate in mechanical communication with said panel for increasing rigidity of said panel.

* * * * *